(12) United States Patent
Nijim et al.

(10) Patent No.: US 9,135,245 B1
(45) Date of Patent: Sep. 15, 2015

(54) FILTERING CONTENT BASED ON ACQUIRING DATA ASSOCIATED WITH LANGUAGE IDENTIFICATION

(75) Inventors: Yousef Wasef Nijim, Roswell, GA (US); Jay Paul Langa, Cumming, GA (US)

(73) Assignee: COX COMMUNICATIONS, INC., Atlanta, GA (US)

(*) Notice: Subject to any disclaimer, the term of this patent is extended or adjusted under 35 U.S.C. 154(b) by 0 days.

(21) Appl. No.: 13/465,778

(22) Filed: May 7, 2012

Related U.S. Application Data

(63) Continuation-in-part of application No. 13/346,247, filed on Jan. 9, 2012.

(51) Int. Cl.
- G06F 17/28 (2006.01)
- G06F 17/27 (2006.01)
- H04N 21/462 (2011.01)

(52) U.S. Cl.
CPC ............ *G06F 17/289* (2013.01); *G06F 17/275* (2013.01); *H04N 21/4622* (2013.01)

(58) Field of Classification Search
CPC .. G06F 17/289; G06F 17/275; H04N 21/4622
USPC .......................................................... 704/3
See application file for complete search history.

(56) References Cited

U.S. PATENT DOCUMENTS

| | | | | |
|---|---|---|---|---|
| 7,392,173 | B2* | 6/2008 | Godoy et al. | 704/9 |
| 8,095,498 | B2* | 1/2012 | Rollins et al. | 707/600 |
| 8,209,724 | B2* | 6/2012 | Rathod et al. | 725/53 |
| 8,375,025 | B1* | 2/2013 | Datar et al. | 707/727 |
| 8,838,437 | B1* | 9/2014 | Buryak et al. | 704/8 |
| 2001/0044726 | A1* | 11/2001 | Li et al. | 704/277 |
| 2007/0169148 | A1* | 7/2007 | Oddo et al. | 725/46 |
| 2008/0221892 | A1* | 9/2008 | Nathan et al. | 704/257 |
| 2009/0222445 | A1* | 9/2009 | Tavor | 707/6 |
| 2010/0057441 | A1* | 3/2010 | Kawabe et al. | 704/8 |
| 2010/0286977 | A1* | 11/2010 | Chin et al. | 704/4 |
| 2011/0004897 | A1* | 1/2011 | Alexander et al. | 725/32 |
| 2012/0030135 | A1* | 2/2012 | Weiss et al. | 705/347 |
| 2012/0290287 | A1* | 11/2012 | Fux et al. | 704/8 |

* cited by examiner

*Primary Examiner* — Jakieda Jackson
(74) *Attorney, Agent, or Firm* — Merchant & Gould P.C.

(57) ABSTRACT

Content is filtered based on acquiring data associated with language identification. Data associated with language identification is acquired. Content is filtered based on a preferred language identified using the acquired data. The data associated with language identification is acquired from a plurality of sources. A language preference model provides a recommendation of a preferred language and determines a source of the acquired data having a highest priority. The acquired data is stored in a user profile.

18 Claims, 6 Drawing Sheets

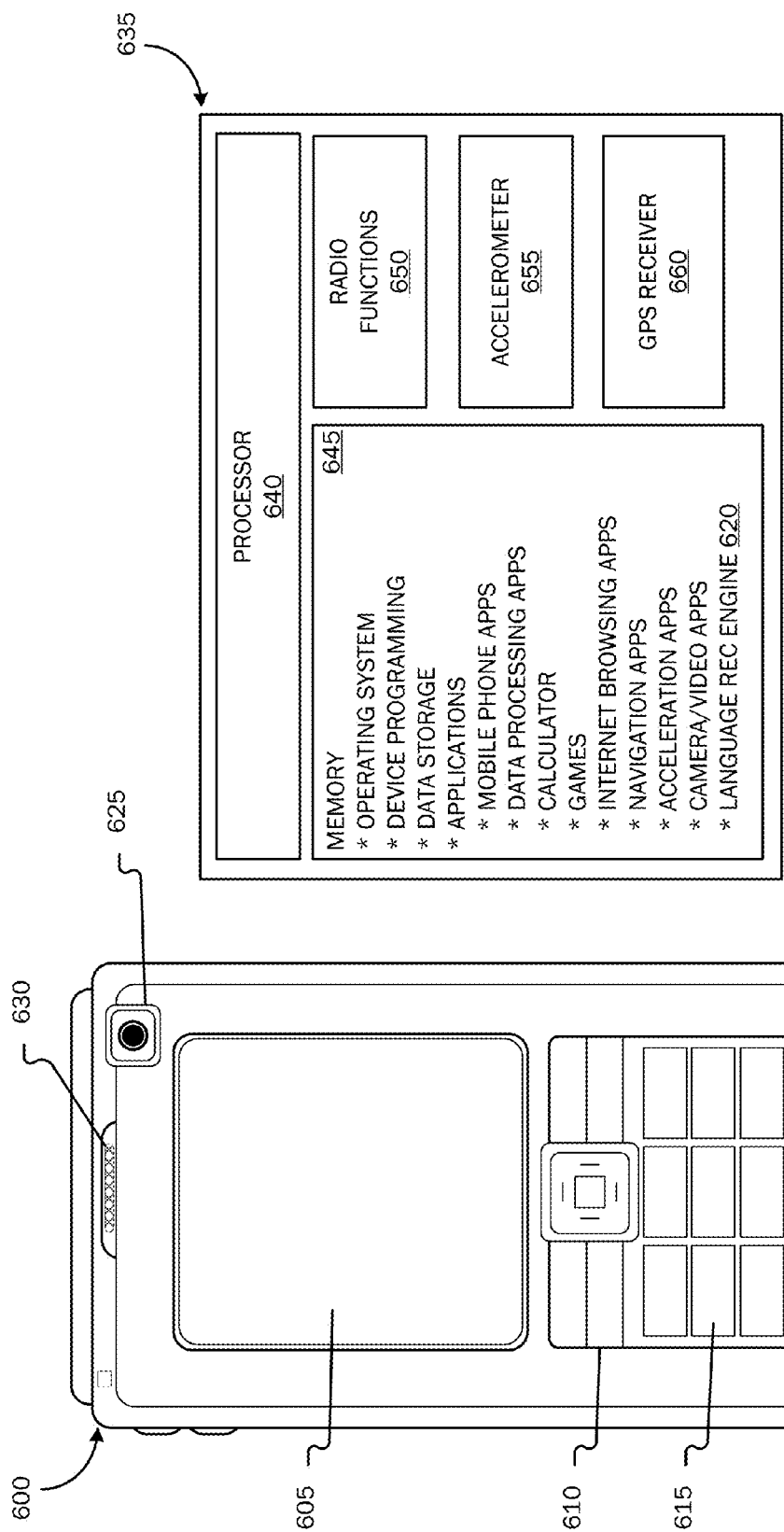

FILTERING CONTENT BASED ON ACQUIRING DATA ASSOCIATED WITH LANGUAGE IDENTIFICATION

CROSS-REFERENCE TO RELATED APPLICATIONS

This is a continuation-in-part application of U.S. application Ser. No. 13/346,247, filed Jan. 9, 2012, and titled "Filtering Content Based on Acquiring Data Associated with Language Identification," the disclosure of which is expressly incorporated herein, in its entirety, by reference.

FIELD OF THE INVENTION

This disclosure relates in general to providing filtered content to a user, and more particularly to filtering content based on acquired data associated with language identification.

BACKGROUND

A wide array of content for viewing may be obtained through different technologies. Movies, television shows, educational videos, etc. may be downloaded using personal computers, laptop computers, tablet/slate devices, smart phones and other Internet capable devices. Documents, books, articles and other texts may also be viewed or downloaded. Cable and satellite systems also provide access to many types of content, such as television programs, movies, video-on-demand content, pay-per-view content, etc.

To discover content of interest to a user, search engines, program guides, push-services and other filtering technologies may be used. Without such tools the plethora of available content would be overwhelming. However, even with such tools, a user is often inundated with content that is in a language that the user lacks proficiency in reading and/or understanding.

For example, electronic program guides (EPG) and interactive program guides provide users of television, radio, and other media applications with continuously updated menus displaying broadcast programming/content or scheduling information for current and upcoming programming/content. Non-interactive electronic program guides (EPG) present a digitally displayed, non-interactive menu of programming/content on a dedicated channel. EPGs are broadcast by specialized video character generation (CG) equipment housed within each such provider's central television distribution facility. By tuning into an EPG channel, a menu is displayed that lists current and upcoming television programs on all available channels.

A more modern form of the EPG is the interactive program guide (IPG). An IPG allows user to navigate scheduling information menus interactively, selecting and discovering programming by time, title, station, or genre using an input device such as a keypad, computer keyboard, or TV remote control. Its interactive menus are generated entirely within local receiving or display equipment using raw scheduling data sent by individual broadcast stations or centralized scheduling information providers. A typical IPG provides information covering the next 7 or 14 days.

Data to populate an interactive EPG may be distributed over the Internet, either for a charge or free of charge, and implemented on equipment connected directly or through a computer to the Internet. Television-based IPGs can also facilitate the selection of programs for recording with digital video recorders (DVRs), also known as personal video recorders (PVRs).

The aspect of an IPG most noticed by users is its graphical user interface (GUI), which is typically implemented as a grid or table listing channel names and program titles and times: Web and Television-based IPG interfaces allow the user to highlight any given listing and call up additional information about it supplied by the EPG provider. IPGs also allow users the option of searching or filtering content by genre, as well as immediate one-touch access to, or recording of, a selected program. Reminders and parental control functions may also often be included. The IPGs may also be configured to control a DVR. However, as can be seen, current EPGs filter content based on a parameter selected by the user, e.g., genre. Filter setup is performed manually by configuring the filters using the guide.

Other filtering tools, such as search engines, data mining tools, social media filters, etc., are also limited in how parameters are used to filter results. For example, a search for a movie of a particular title may generate results that include an English version, a Spanish version, an English version having French subtitles, a Spanish language book of the title, an English language book of the title, etc. Thus, the user is forced to scan through the search results to identify results that the user is interested in viewing or downloading.

It can be seen then that there is a need for providing content filtering based on acquired data associated with language identification.

SUMMARY OF THE INVENTION

To overcome the limitations described above, and to overcome other limitations that will become apparent upon reading and understanding the present specification, embodiments for filtering content based on acquired data associated with language identification are disclosed.

Content is filtered based on acquiring data associated with language identification. Data is acquired from a plurality of sources. A language preference model provides a recommendation of a preferred language and determines a source of the acquired data having a highest priority. The acquired data is stored in a user profile.

A method for filtering content based on acquiring data associated with language identification is disclosed. The method includes acquiring data associated with language identification and filtering content based on a preferred language identified using the acquired data.

In another embodiment, a system for filtering content based on acquiring data associated with language identification is disclosed. The system includes a language preference model for acquiring data associated with language identification and processing the acquired data to identify a preferred language and a recommendation engine receiving the identified preferred language from the language preference model and filtering content based on the identified preferred language.

In another embodiment, a computer-readable storage medium that includes instructions, that when executed, filters content based on acquiring data associated with language identification, is disclosed. The instructions include acquiring data associated with language identification and filtering content based on a preferred language identified using the acquired data.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIGS. 6a-b illustrate a suitable mobile computing environment for providing content based on collection of language predictive data according to an embodiment.

DETAILED DESCRIPTION

Embodiments are directed to filtering content based on acquired data associated with language identification. Data is acquired from a plurality of sources. A language preference model provides a recommendation of a preferred language and determines a source of the acquired data having a highest priority. The acquired data is stored in a user profile.

Figure 1:
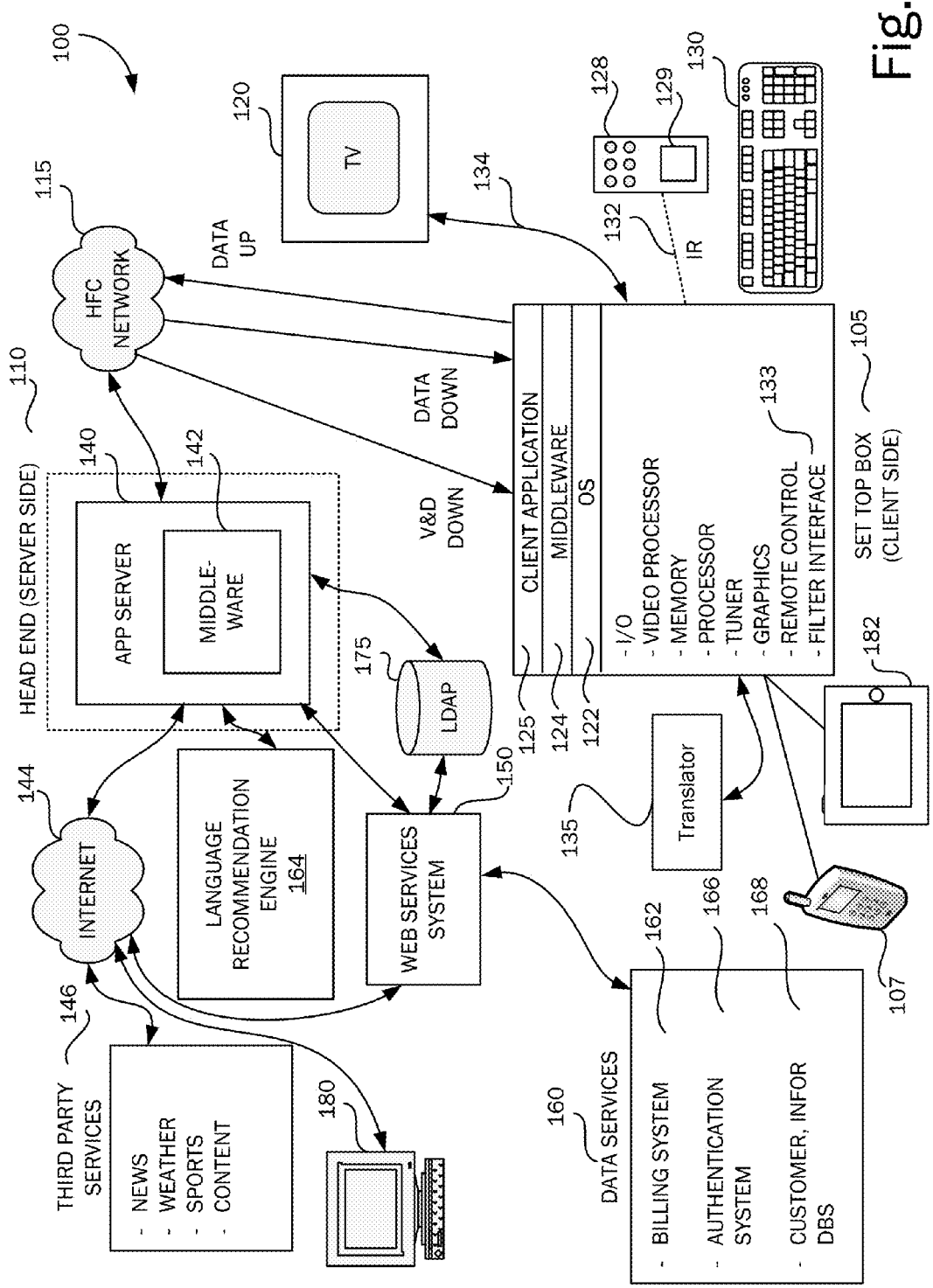
FIG. 1 illustrates a simplified block diagram illustrating a cable television/services system architecture providing an operating environment according to an embodiment.

FIG. 1 is a simplified block diagram illustrating a cable television/services system 100 (hereafter referred to as "CATV") architecture providing an operating environment according to an embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of subscribers. Coaxial cable runs from the optical fiber feeders to each customer or subscriber. The functionality of the HFC network 115 allows for efficient bidirectional data flow between the client-side set-top box 105 and the server-side application server 140 of the embodiment.

The CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 may be provided to allow a given software application to be executed by a variety of different operating systems. According to an embodiment, the middleware layer 124 may include a set of application programming interfaces (APIs) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. The middleware layer 142 of the server-side application server and the middleware layer 124 of the client-side STB 105 may format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a relative high frequency, e.g., between 54 and 860 megahertz. The signaling space is generally divided into channels in which may be transmitted as a single analog signal or a greater number (e.g., ten) of digital signals.

The data downlink and the data uplink, illustrated in FIG. 1, between the HFC network 115 and the set-top box 105 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing, billing presentment and payment receipt.

A customer information database 168 may include general information about customers such as place of employment, business address, business telephone number, and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

Referring still to FIG. 1, web services system 150 is illustrated between the application server 140 and the data services 160. According to embodiments, web services system 150 serves as a collection point for data requested from each of the disparate data services systems comprising the data services 160. According to embodiments, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

A language recommendation engine 164 is provided according to an embodiment to filter out content based on obtaining data associated with language identification, such as from a setting indicating a language or based on behavior of a user or a user device, such as STB 105, remote control device 128, keyboard 130, or other computing device 180, such as a tablet/slate computer, smart phone, etc. STB 105 provides a filter interface 133 for presenting filtered programming/content via STB 105 on the TV 120. While the filter interface 133 may be implemented using STBs 105, the person having ordinary skills in the art will understand that the filter interface 133 may be provided through wireless device 107, any type of network media device 182, or any device capable of interfacing with a STB 105 or in a server or other module on the head end side 110. Such devices may include DVRs, wireless phones, PCs, laptop computers, tablet/slate computers, media viewing devices, or equivalents thereof. Further, filter interface 133 may be provided through a STB. A translator 135 may be accessed by the filter interface 133 for providing translations, for example, using a language identified as most often used.

An authentication system 166 may include information such as secure user names, subscriber profiles, subscriber IDs, and passwords utilized by customers for access to network services. As should be understood by those skilled in the art, the disparate systems 150, 162, 164, 164, 166, 168, 175 may be integrated or provided in any combination of separate systems, wherein FIG. 1 shows only one example.

Figure 2:
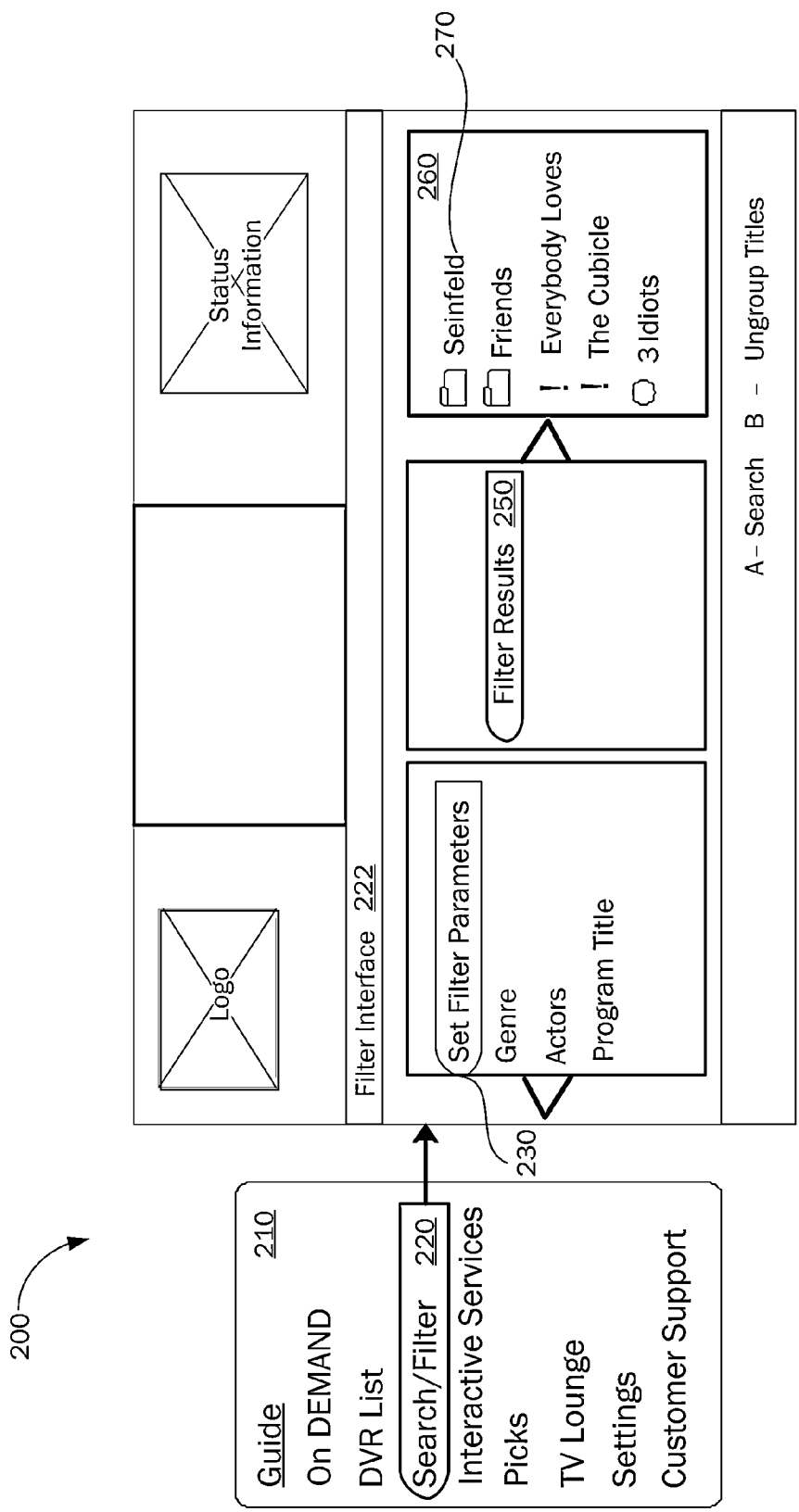
FIG. 2 shows the filtered programs screen according to an embodiment.

FIG. 2 shows a filtered programs screen 200. In one embodiment, a program guide 210 may be used by a user to select a search or filter function 220 to filter the programming to generate a list for watching or recording. The user selects the DVR Filter option 220 from the main menu of the guide 210, and then the filter interface 222 is displayed. On the filter interface 222, program parameters 230 may be selected to generate a list. Filter results 250 are presented on the filter interface 222. A list of programs 260 meeting the filter parameter 230 selected by the user is displayed, e.g., sitcoms. A program, e.g., "Seinfeld" 270, from the list 260 may be selected by the user for recording or for watching. Thus, the user may configure a filter manually by selecting filter parameters 230 using the guide 210. In addition, recommendations 260 may be provided by a recommendation engine at a head end based on obtaining data associated with language identification, such as from a setting indicating a language or based on behavior of a user or a user device.

Figure 3A:
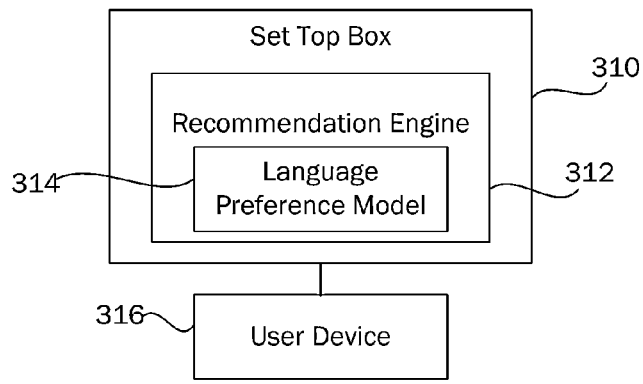
FIGS. 3a-c illustrate block diagrams of systems implementing content filtering being provided based on a parameter associated with a type of device according to an embodiment.
Figure 3B:
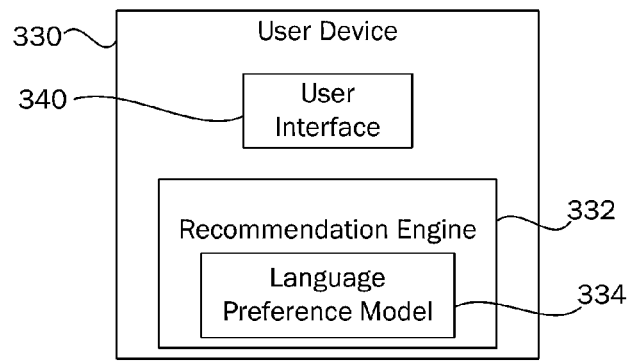
Figure 3C:
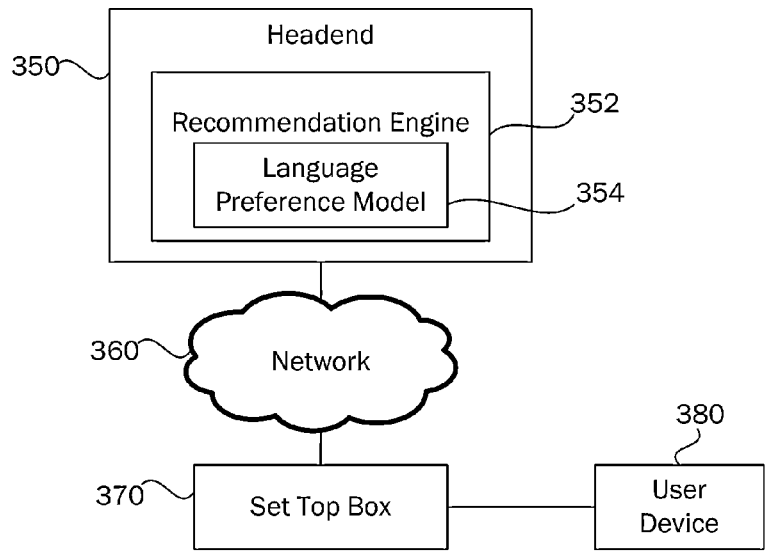

FIGS. 3a-c illustrate block diagrams of systems implementing content filtering being provided based on a parameter associated with a type of device. FIG. 3a illustrates a block diagram of a set-top box (STB) 310 according to one embodiment. In FIG. 3a, the STB 310 may include a recommendation engine 312. The recommendation engine 312 may include a language preference model 314 that uses data associated with language identification obtained from a user device 316. However, those skilled in the art will recognize that the language reference model 314 may be provided separate from the recommendation engine 312. For example, the language reference model 314 may be provided separate when the recommendation engine 312 is not included. Nevertheless, for simplicity, FIGS. 3a-c will show the language reference model 314 included with the recommendation engine 312. The data used by the language reference model may be obtained from a setting on the device 316 indicating a language or may be based on behavior of a user or the user device 316. In addition, other user behavior on the device may be captured to filter and/or sort content based on the captured and analyzed behavior. The language preference model 314 may be a mathematical model for determining a preferred language that may be used to filter content, to provide content associated with a determined preferred language, e.g., movies in a certain language or having subtitles in a certain language, etc.

FIG. 3b illustrates a block diagram of a user device 330 for implementing content filtering being provided based on a parameter associated with a type of device. In FIG. 3b, a user device 330, such as a smart phone, a media controller, a tablet/slate computer, personal computer, laptop, etc., may include a recommendation engine 332. The recommendation engine 332 includes a language preference model 334 that uses data associated with language identification obtained from a user device 330. The data may be obtained from a setting on the device 330, e.g., via a user interface 340, indicating a language or may be based on behavior of a user or the user device 330. The language preference model 334 may be a mathematical model for determining a preferred language that may be used to filter content, to provide content associated with a determined preferred language, e.g., movies in a certain language or having subtitles in a certain language, etc.

FIG. 3c is a block diagram of a system for implementing content filtering being provided based on a parameter associated with a type of device. In FIG. 3b, a user device 380 is coupled to a head end 350 through a network 360 (or cloud). A STB 370 may be disposed between the user device 380 and the network 360. However, the user device 380 may connect to the head end 350 without going through an intermediate device such as a STB 370. In FIG. 3b, the user device 380 may be a smart phone, a media controller, a tablet/slate computer, personal computer, laptop, etc. The head end 350 may include a recommendation engine 352. The recommendation engine 352 includes a language preference model 354 that uses data associated with language identification obtained from a user device 380 or behavior of the user device 380. For example, the data associated with language identification may be obtained from a setting on the device 380 indicating a language or may be based on behavior of a user or the user device. The language preference model may be a mathematical model for determining a preferred language that may be used to filter content, to provide content associated with a determined preferred language, e.g., movies in a certain language or having subtitles in a certain language, etc.

Referring to FIG. 3c as an example, a recommendation engine 352 that includes a language preference model 354 uses data associated with language identification that is obtained from a user device 380 or derived from behavior of the user device 380. For example, the data associated with language identification may be obtained from a setting on the device 380 indicating a language or may be based on capturing the user's behavior of the user device 380. The language preference model 354 may be a mathematical model for determining a preferred language that may be used to filter content, to provide content associated with a determined preferred language, e.g., movies in a certain language or having subtitles in a certain language, etc. Data associated with language identification, such as from a setting indicating a language or based on behavior of a user or a user device 380, is obtained and content is filtered based on the obtained data associated with language identification. For example, content may be filtered based on the language choice of the keyboard of the device 380, based on the language that is mostly used on the device 380, the language chosen of the guide, or certain behavior on the device 380 such as closed captioning or subtitling, programs viewed the most. Also, a user may filter content based on a desired language by manually selecting a preferred language using a user interface (see user interface 340 in FIG. 3b). The preferred language setting may be associated with one device 380 or could be extended to all registered devices. For example, if the keyboard language is Spanish, content may be filtered so that only Spanish content is displayed to the user. The customer can disable this feature or enable it through a user interface 340.

Content may be filtered from an Electronic Program Guide (EPG) or from search result obtained while browsing the Internet looking for programming content (video content). User interface 340 may be used to expand to all content, i.e., turn the language filtering off, if the customer chooses. If the customer uses another language for search or viewing content, e.g., by setting Secondary Audio Programming (SAP) using the user interface 340, then content may be filtered based on the selected SAP. If the customer chooses SAP, then the language to be displayed may be predicted using the language preference model and EPG content may be filtered based on the chosen language. For wireless device 380, the invention may filter content based on the chosen language of a particular device 380 when a user sets a language for the device 380.

Content may be filtered automatically to display programs based on the desired language of the device. If the customer owns more than one device 380, but chooses the language for one of the device 380, then content may be filtered across the multiple devices 380 by maintaining a user profile database that includes an identification of device 380 associated with a user. Additionally, after finding the chosen language or the mostly used language across multiple devices or one device 380, the recommendation engine 352 uses the identified preferred language to recommend content based on the identified preferred language associated with a device 380 associated with the user.

Content may be filtered based on the chosen language for subtitling, a preferred language for closed captioning and/or when certain language subtitles have been used. The language preference model predicts and adjusts automatically according to the language used by the user and through using a statistical model the content will be sorted out based the language mostly used, less used, etc. However, the preferred language may be selected manually through the user interface 340.

Other filters may also be applied using the same mechanism. For example, if a customer will be watching football in 2 weeks, all football games may be filtered on the EPG and presented to the user when navigating the EPG. The user may also simply view a listing of filtered programs. The language preference model may use a statistical method or a linear prediction for the more complicated options. In addition, linear prediction may also be provided based on the identified preferred language.

Figure 4:
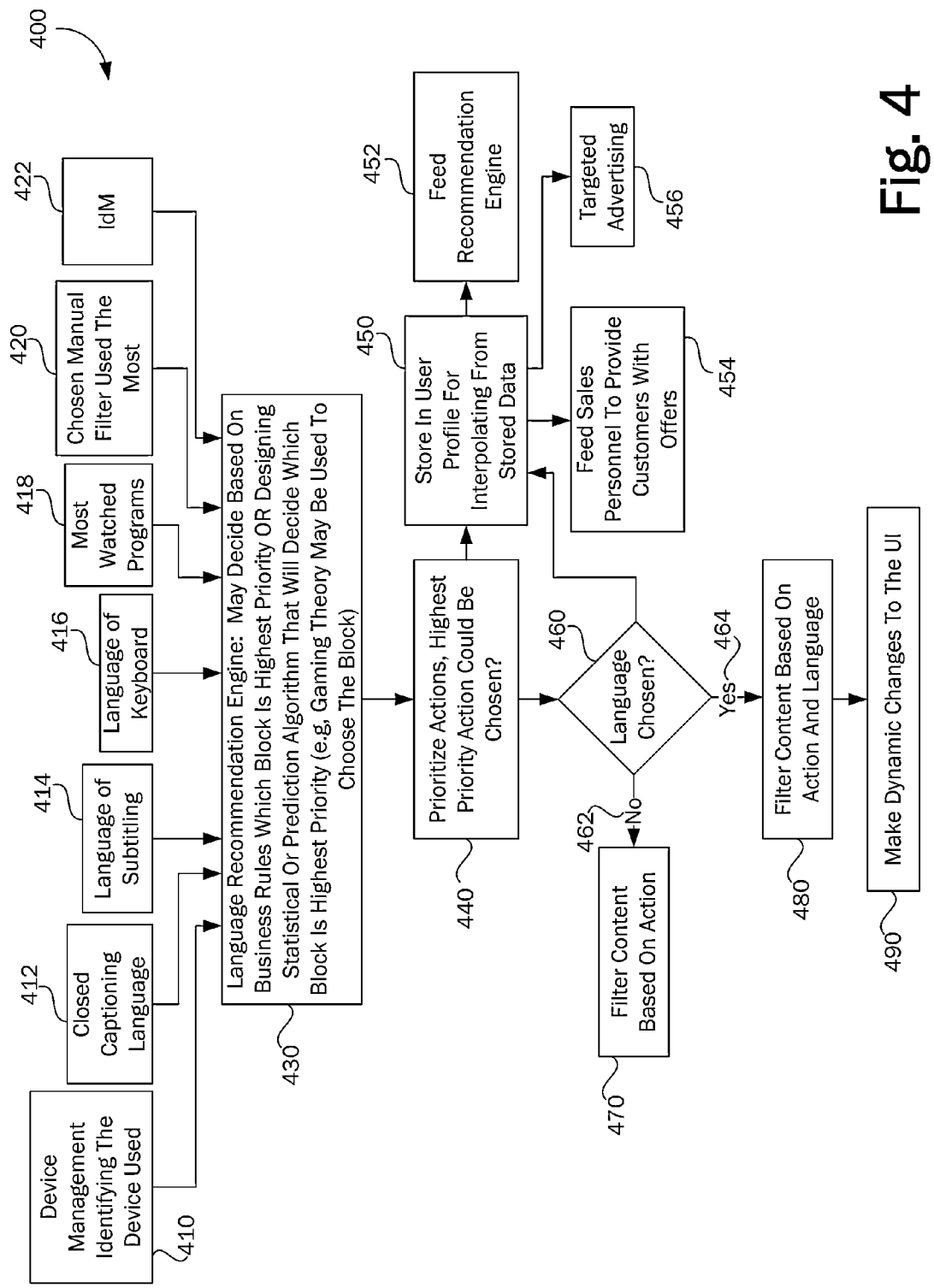
FIG. 4 is a flow chart illustrating content filtering being provided based on obtaining data associated with language identification according to an embodiment.

FIG. 4 is a flow chart 400 illustrating content filtering being provided based on obtaining data associated with language identification. The data associated with language identification may be obtained from a setting indicating a language or based on behavior of a user or a user device. However, those skilled in the art recognize that other sources of data for identifying a preferred language may be used without departing from the scope of the present embodiments. In FIG. 4, data for identifying a preferred language is obtained from different sources. Device management may be employed to identify the user device 410. In addition, selection of a closed captioning language 412, a subtitle language 414, and a language associated with a keyboard 416 may be obtained. Further, the most-watched programs may be identified 418. In addition, manual settings of a user may be detected 420, such as a manual filter chosen most often by a user. Another source for obtaining data associated with language identification includes identity management (IdM) 422.

Once data associated with language identification is obtained, a language recommendation engine 164 generates a recommended language 430. For example, a mathematical model may be applied to the data to provide a recommendation of a preferred language. In addition, business rules may be used to decide which block has the highest priority. A statistical or prediction algorithm may be used to decide which block has the highest priority. Gaming theory may also be used to choose the block having the highest priority.

Next, actions may be prioritized and an action having the highest priority may be chosen 440. This information may be stored in a user profile for interpolating from stored data 450 and provided to a recommendation engine 452. The user profile may also be provided to sales personnel so that dynamic offers may be provided to customers 454. In addition, the user profile may be used to provide targeted advertising 456.

A determination is made whether a preferred language is identified 460. If not 462, a manual setting may be used to filter content 470. When a preferred language is identified 464, content is filtered based on the data obtained from a user device or derived form behavior of the user device 480. Dynamic changes may be made to the user interface based on the identification of a preferred language 490.

Figure 5:
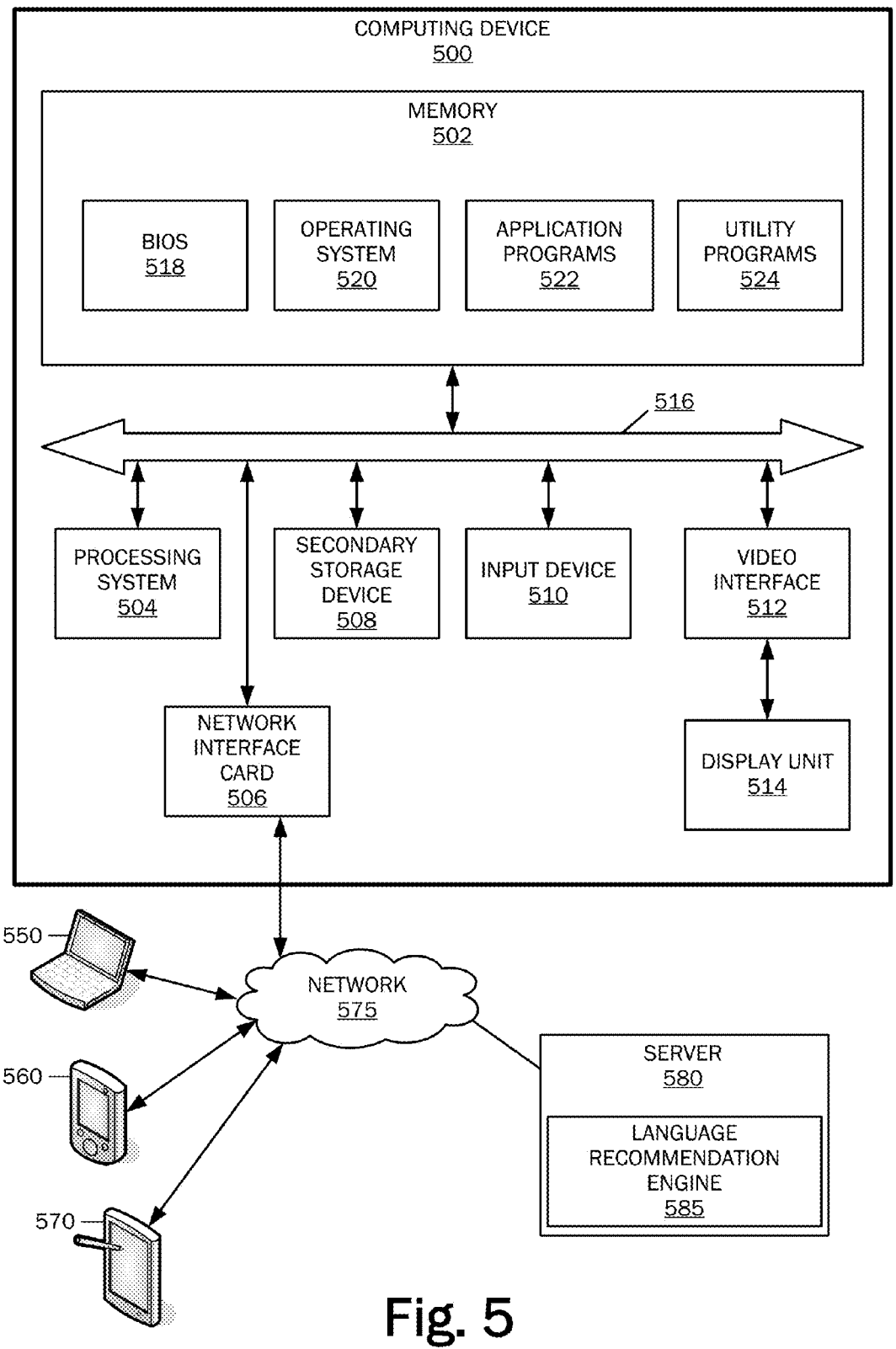
FIG. 5 is a block diagram illustrating example physical components of a computing device and a system architecture for providing language preference filtering according to an embodiment.

FIG. 5 is a block diagram illustrating example physical components of a computing device 500 with which embodiments may be practiced. In some embodiments, the language recommendation engine 585 may be implemented using one or more computing devices like the computing device 500. It should be appreciated that in other embodiments, the language recommendation engine 585 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules.

The memory 502 includes one or more computer-readable storage media capable of storing data and/or computer-executable instructions. According to one embodiment, the language recommendation engine 585 may be stored locally on computing device 500. Memory 502 thus may store the computer-executable instructions that, when executed by processor 504, cause the language recommendation engine to provide a recommendation of a preferred language and determine a source of acquired data having a highest priority as described above with reference to FIGS. 1-4.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users, for example, the language recommendation engine 585. The memory 502 also stores one or more utility programs 524 that, when executed by the processing system 504, cause the computing device 500 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 5 may be integrated onto a single integrated circuit. When operating via such a single integrated circuit, the functionality, described herein, with respect to the language recommendation engine 585 may be operated via application-specific logic integrated with other components of the computing device/system 500 on the single integrated circuit.

A server 580 may provide the language recommendation engine 585 to client devices. As one example, server 580 may be a web server providing the language recommendation engine 585 over the web. Server 580 may provide the language recommendation engine 585 over the web to clients through a network 575. Examples of clients that may obtain the language recommendation engine 585 include computing device 550, which may include any general purpose personal computer (such as computing device 500), a tablet computing device 570 and/or mobile computing device 560, such as smart phones.

FIGS. 6a-b illustrate a suitable mobile computing environment, for example, a mobile computing device 600, a smart phone, a tablet personal computer, a laptop computer, and the like, with which embodiments for providing content based on collection of language predictive data may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 625 functionality associated with the mobile computing device, or any other suitable input means. Data may be output via the device 600 via any suitable output means, including but not limited to, display on the display screen 605, audible output via an associated speaker 630 or connected earphone system, vibration module for providing tactile output, and the like.

Referring now to FIG. 6b, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the language recommendation engine 620 may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network. Radio functions 650 may be utilized to communicate with a wireless or WIFI-based positioning system to determine a device's 600 location.

Although described herein in combination with mobile computing device 600, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-4. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method, implemented by a computing device, for filtering content based on acquiring data associated with language identification, comprising:
    providing an interactive program guide via a computing device to present content to a customer on a display;
    acquiring data associated with language identification from a plurality of sources associated with the content of the interactive program guide;
    performing an analysis of the acquired data associated with language identification to determine which source of the plurality of sources associated with the content of the interactive program guide has a highest priority;
    in response to performing the analysis of the acquired data, utilizing the source with the highest priority to determine a preferred language of the interactive program guide and filtering the content from the interactive program guide based on the preferred language identified using the acquired data, wherein filtering content based on a preferred language identified using acquired data comprises the computing device filtering data based on a parameter associated with and obtained from a user device or based on the user's use of the user device; and
    displaying the interactive program guide comprising the filtered content in the preferred language on the display.

2. The method of claim 1, wherein the obtaining data from a plurality of sources comprises obtaining data from two or more of a device management interface, a closed captioning language selection, a subtitle language selection, a language associated with a keyboard, a language associated with programs most watched by a user, manual settings of a user and data from identity management (IdM).

3. The method of claim 1 further comprises applying a mathematical model to the acquired data to provide a recommendation of a preferred language.

4. The method of claim 1 further comprising applying business rules to determine a source having a highest priority.

5. The method of claim 1 further comprising executing at least one selected from performing a statistical analysis to determine a source having a highest priority and prioritizing actions to identify an action having a highest priority.

6. The method of claim 1, wherein the filtering content based on a preferred language identified using the acquired data further comprises accessing a translator for translating using a language identified as most often used.

7. The method of claim 1 wherein the filtering content based on a preferred language identified using the acquired data further comprises filtering data based on an identified preferred language of the user device or filtering data based on the user's behavior derived from use of the user device.

8. A system for filtering content based on acquiring data associated with language identification, comprising:
- a computing device having a processor and a memory including instructions, which when executed by the processor, provides:
  - a language preference model for acquiring data associated with language identification from a plurality of sources associated with the content of an interactive program guide, performing an analysis of the acquired data associated with language identification to determine which source of the plurality of sources associated with the content of an interactive program guide has a highest priority, and in response to performing the analysis, processing the acquired data to utilize the source with the highest priority to identify a preferred language of the interactive program guide based on the analysis of the acquired data associated with language identification; and
  - a recommendation engine, in response to performing the analysis,
- receiving the identified preferred language from the language preference model and filtering content presented in the interactive program guide based on the identified preferred language, wherein filtering content presented in the interactive program guide based on a preferred language identified comprises the computing device filtering data based on a parameter associated with and obtained from a user device or based on the user's use of the user device.

9. The system of claim 8, wherein the plurality of sources comprise two or more of a device management interface, a closed captioning language selection, a subtitle language selection, a language associated with a keyboard, a language associated with programs most watched by a user, manual settings of a user and data from identity management (IdM).

10. The system of claim 8, wherein the language preference model applies a mathematical model to the acquired data to provide a recommendation of a preferred language.

11. The system of claim 8, wherein the language preference model applies business rules to determine a source having a highest priority.

12. The system of claim 8, wherein the language preference model performs a statistical analysis to determine a source having a highest priority.

13. The system of claim 8, wherein the language preference model prioritizes actions to identify an action having a highest priority.

14. The system of claim 8, wherein the acquired data associated with language identification is storing is a database for access by the language preference model to generate a user profile for use by the recommendation engine in filtering content based on the identified preferred language.

15. A computer-readable storage device, including instructions, that when executed filters content based on acquiring data associated with language identification, the instructions comprising:
- providing an interactive program guide to present content to a user;
- acquiring data associated with language identification from a plurality of sources associated with the content;
- performing a statistical analysis to determine which source of the plurality of sources associated with the content has a highest priority; and
- in response to performing the statistical analysis, utilizing the source with the highest priority to determine a preferred language of the interactive program guide or the search results and filtering the content from the interactive program guide or the search results based on the preferred language identified using the acquired data wherein filtering content from the interactive program guide based on the preferred language identified using acquired data comprises a computing device filtering data based on a parameter associated with and obtained from a user device or based on the user's use of the user device.

16. The computer-readable storage device of claim 15, wherein the instructions further comprise applying a mathematical model to the acquired data to provide a recommendation of a preferred language.

17. The computer-readable storage device of claim 15, wherein the instructions further comprise applying business rules to determine a source having a highest priority.

18. The computer-readable storage device of claim 15, wherein the instructions further comprise executing at least one selected from performing a statistical analysis to determine a source having a highest priority and prioritizing actions to identify an action having a highest priority.

* * * * *